United States Patent

Morris et al.

[15] 3,660,134
[45] May 2, 1972

[54] INORGANIC MATERIALS SURFACE REACTED WITH ORGANO TITANIUM COMPOUNDS

[72] Inventors: Horton H. Morris; James P. Olivier, both of Macon, Ga.

[73] Assignee: Freeport Sulphur Company, New York, N.Y.

[22] Filed: Oct. 30, 1969

[21] Appl. No.: 872,730

[52] U.S. Cl. .................. 106/308 Q, 106/288 B, 106/299, 106/300, 106/309
[51] Int. Cl. ................................................... C09c 3/00
[58] Field of Search .............. 106/288 B, 288 Q, 299, 300, 106/308 I, 308 O, 308 F, 309; 260/429.5

[56] References Cited

UNITED STATES PATENTS

| | | |
|---|---|---|
| 2,621,193 | 12/1952 | Langkammerer .................. 260/429.5 |
| 3,025,172 | 3/1962 | Bernstein .......................... 106/308 Q |
| 3,025,173 | 3/1962 | Bernstein .......................... 106/300 |
| 3,432,323 | 3/1969 | Wigginton ........................ 106/308 Q |

*Primary Examiner*—James E. Poer
*Attorney*—W. Philip Churchill

[57] ABSTRACT

Inorganic materials in particulate or fibrous form the surfaces of which have been reacted with an organo titanium compound are described. The products are particularly suitable as fillers in solvent coating compositions and as settling aids for oil.

8 Claims, No Drawings

INORGANIC MATERIALS SURFACE REACTED WITH ORGANO TITANIUM COMPOUNDS

FIELD OF THE INVENTION

This invention relates to inorganic materials, to a method for treating the surfaces thereof with organo titanium compounds and to the treated inorganic material. The inorganic materials may be clay, minerals, metals, pigments, glasses, etc. The organo titanium compounds are organic derivatives of orthotitanic acid containing at least two hydrolyzable groups.

PRIOR ART

Inorganic materials have long been used as fillers or pigments for paints, paper coatings, etc. They may be used to increase the density of such compositions, to change the electrical characteristics, as colorants, opacifiers, etc. They are essentially hydrophilic, i.e., easily wetted by water and compatible to some extent with resins and polymers. However, their compatibility is limited and high loadings in organic systems severely impair strength and other important properties.

Organo titanium compounds are well known. Starting from the tetraalkyl ortho titanates, a wide variety of compounds may be prepared by reaction with organic acids e.g., U.S. Pat. Nos. 2,721,195 and 2,708,203) to form alkyl titanium carboxylates, with alcohols and organic esters to form higher molecular weight or mixed titanium esters, with enols derived from aldehydes to yield vinyl titanium esters and with a variety of other organic reagents to form substituted titanates.

Certain of these ortho titanium organic derivatives may be hydrolyzed to produce higher molecular weight products which, if structure and reaction are controlled, can result in the formation of an amorphous film of an organo substituted titanium oxide.

OBJECTS OF THE INVENTION

One object of this invention is to provide coated inorganic materials in which the coating is an integral part of the material.

Another object of the invention is to provide improved fillers and pigments.

A further object is to provide a process for treating inorganic materials to improve the properties thereof.

Still another object is to provide hydrophobic, organophilic inorganic materials.

SUMMARY OF THE INVENTION

These and other objects are attained by reacting an organo titanate, as subsequently described, with the surfaces of inorganic fibers or particulate material to yield products which are hydrophobic and organophilic.

The inorganic materials of this invention may be in particulate (of any particle size distribution and any particle shape) or in fibrous form. Among the materials which may be used are steel wool, silicon whiskers, alumina, clays, iron filings, barium sulfate, glass fibers, foliated glass, vermiculite, asbestos, mica, etc., calcium carbonate and pigments such as iron oxides, zinc chromate, titanium dioxide, etc.

Clays are a preferred inorganic filler because of the superior physical properties of the treated clays in comparison with the untreated clays, the ready availability of the clays and their relatively low cost. Illustrative clays are untreated or treated (e.g., calcined or delaminated) English or Georgia filler and coating clays.

Clays are composed of two atomic lattice structural units. One consists of two sheets of closely packed oxygen atoms or hydroxyl groups in which aluminum (and occasionally iron or magnesium) atoms are embedded in octahedral coordination. The second unit is built of silica tetrahedrons, arranged so as to form a hexagonal network, which is repeated indefinitely to form a sheet-like structure. In kaolinite, the structure is composed of a single tetrahedral sheet and a single aluminum octahedral sheet combined in a unit so that the tips of the silica tetrahedrons and one of the layers of the octahedral sheet form a common layer. The aluminum sheet, in a unit cell, carries six hydroxyl groups, which appear on one surface of the cell and two hydroxyl groups which project toward the center of the cell. The structural formula can be represented by $(OH)_8Si_4Al_4O_{10}$. Clay minerals, therefore, contain hydroxyl groups which can be pictured as potential reaction sites. Clay minerals are also very finely divided and have surface areas varying from about one square meter per gram up into the 100 square meter per gram range. Like all finely divided and fibrous materials water is generally adsorbed onto the clay particles in very small amounts and can serve as a reaction site.

The organo titanium compounds used to react with the inorganic filler material may be represented by the formula $Ti(OR)_m R'_{-m}$ wherein R is a hydrocarbon radical containing from one to 12 carbon atoms and R' may be OCOR'', OR''' or a hydrocarbon substituted silicic acid radical (OSiR'') wherein R'' is a substituted or unsubstituted hydrocarbon radical having from one to 40 carbon atoms and wherein R''' is a substituted or unsubstituted hydrocarbon radical having from six to 40 carbon atoms providing that R''' and R are not identical. In the formula $m$ is equal to 2 or 3. At least two hydrolyzable groups, preferably OR groupings, must be present in the organo titanium compound in order that hydrolysis of the organo titanium compound occurs followed by its polymerization to produce a film of organo-substituted titanium oxide at the filler surface. Through this reaction the surface of the filler is provided with a hydrophobic, organophilic film.

The organo titanium compounds may be prepared by reacting 1 mol of $Ti(OR)_4$ with from 1 to 2 mols of a compound represented by the formula AR' wherein A is hydrogen or a group capable of reacting to remove an OR from the $Ti(OR)_4$ molecule and R' is as described above. A mixture of two or more compounds of the formula AR' may be used. The preparation of illustrative organo titanium compounds is more particularly described in U.S. Pat. No. 2,621,193.

Reverting to the starting material $Ti(OR)_4$, R may be selected from the group consisting of alkyl, cycloalykyl, aryl, aralkyl, and alkaryl radicals containing from one to 12 carbon atoms. Specific examples of compounds represented by the formula are tetramethyl titanate, tetraethyl titanate (ethyl orthotitanate), tetrabutyl, tetraisopropyl, tetraamyl, tetraoctyl, tetradodecyl, tetra-2-ethyl-hexyl, tetrabenzyl, tetraphenyl and tetra-betanaphthyl titanates.

The radical R'' mentioned above represents a hydrocarbon radical having from one to 40 carbon atoms taken from the group consisting of alkyl, cycloalkyl, aryl, aralkyl, alkaryl hydrocarbon radicals which may contain various substituents such as halogens, e.g., a perfluoro methyl radical, hydroxyl groups, keto group (radical of levulinic acid) amino, nitro and heterocyclic groups. Examples of R'' groups are methyl, ethyl, propyl, butyl, pentyl, hexyl, heptyl, octyl, octadecyl, cyclohexyl, cycloheptyl, phenyl, naphthyl, tolyl, xylyl, benzyl, phenyl ethyl, chlorophenyl, dibromophenyl, 2,3-dihydroxy propoxy. The various hydrocarbon radicals may contain aliphatic unsaturation as well as aromatic unsaturation. Perfluoro compounds may be used. R''' is of similar scope but with the exclusion of radicals containing five or less carbon atoms.

A preferred class of compounds represented by the formula AR' are the organic aromatic and aliphatic carboxylic acids. The resulting organo titanium compound may be called an ester carboxylate or an ester anhydride of ortho titanic acid. Among the aliphatic and aromatic organic acids that may be used are straight or branch chain, saturated or unsaturated, substituted or unsubstituted mono- or poly- carboxylic acids including such acids as stearic, palmitic, ricinoleic, linoleic, lauric, myristic, oleic, benzoic, caproic, caprylic, nonylic, capric, linseed oil acids, castor oil acids, tall oil acids, cocoanut oil acids, soybean oil acids, tung oil acids, perfluorooctanoic acid, phthalic acid, adipic acid, etc.

A second class of useful compounds which generally will be used in conjunction with one of the acids cited above, although they can be used as sole component of the reaction with the Ti(OR)$_4$ are the organic alcohols or organic phenols. Among such compounds are 2-phenoxyethanol, m-cresol, diethylene glycol, 2,6-dioctadecyl cresol, 1-(2-pyridylazo)-2-naphthol, naphthol, anisyl alcohol, glycerol, gernaiol, etc.

In some cases the combined effect of the two classes just cited may be obtained by using an ester such as the triglyceride of ricinoleic acid.

The inorganic fillers of this invention comprise fillers in particulate (of any particle size distribution and any particle shape) or fibrous form. As long as the inorganic filler contains at its surface reactive hydroxy groups and/or about 0.1 to about 2 weight percent based on the filler of adsorbed water, the specific chemical nature of the filler is not important. Such widely diverse materials as steel wool, silicon whiskers, alumina, clays and iron filings may be used depending on specific properties desired in the end product. Other well known inorganic fillers are calcium carbonate, barium sulfate, glass in the form of fibers or thin platelets, vermiculite, asbestos, mica, etc.

The inorganic filler-organo titanate products are formed by dissolving the organo titanate in an anhydrous organic solvent, wetting the surface of the inorganic filler with the solution and maintaining contact between the two materials until reaction is completed. Generally the reaction occurs spontaneously but, in some cases, gentle heating is required to speed the reaction. The solvent and hydrolysis products are then removed by distillation or filtration. As a result of this treatment, it is believed an extremely thin layer of an organic substituted titanium compound or hydrated titanium oxide is formed by hydrolysis of the titanium compound on the surface of the inorganic material, due to the presence of hydroxyl groups in the inorganic filler, e.g., in conventional clays, or due to the presence of a trace of adsorbed water. Whatever the mechanism, the product is stable to further processing conditions.

The amount of organo titanate used will vary from about 0.5 to about 6 weight percent based on the dry weight of the inorganic material, the amount used being partially dependent on the surface area of the inorganic material since it is essential that substantially all of the surface area be reacted. The organo titanate should generally be dissolved in a solvent which does not react with the titanate. Such solvents are hydrocarbons such as naphtha, hexane, octanes, etc. and chlorinated hydrocarbons such as trichloroethylene. The solvents should be anhydrous. In the event that the organotitanium compound is volatile, the inorganic material may be directly reacted with it by passing the gaseous material across the inorganic surfaces. The volatile organo titanate may be diluted with a dry inert gas to facilitate this process. If the inorganic material lacks reactive hydroxyl groups at its surface and has been subjected to severe drying conditions, it will be necessary to mix it with water such that its surface contains from about 0.1 to about 2 weight percent of water prior to the reaction with the organo titanate.

The particle size and shape of the inorganic material employed is important only with respect to its end use. A relatively coarse size can be advantageous if the composition is to be used for oil spill treatment.

The hydrophobic, organophilic inorganic-organo titanium compounds of this invention may be used to produce high solids organic slurries, e.g., for use in solvent coating applications, where high solvent losses or high solvent recycle loads are to be avoided. Because they disperse easily and rapidly into organic materials, they are dispersible in oils to the extent that the oils attain a specific gravity greater than that of water. Consequently, the compounds can be sprinkled or otherwise added to oil floating on water, whereupon the compounds will disperse in the oil layer and the resulting high specific gravity material sinks in the water — a result to be desired in cases where oil spills have occurred on oceans or lakes.

The hydrophobic, organophilic compounds are compatible with a variety of organic systems. They can be used in organic-based paints, in solvent coating systems, and other organic systems where a high solids content is desired. By use of substituted organo titanates which contain hydroxyl or amino groups which do not enter into the reaction with the inorganic material compounds may be prepared which can be used in aqueous media.

The following examples are given in illustration and are not intended as a limitation on the scope of this invention. Where parts are mentioned they are parts by weight

EXAMPLE I

Triisopropyl monooleic titanate was prepared by mixing 258 grams (0.91 moles) of tetraisopropyl titanate with 256 grams (0.91 moles) of oleic acid at room temperature accompanied by stirring. The mixture became warm immediately indicating the occurrence of the desired reaction, and was allowed to stand for several minutes. The product was triisopropyl monooleyl titanate dissolved in isopropyl alcohol. Without removing the alcohol the product was mixed with 50 pounds of naphtha to produce a low viscosity solution containing the titanate. Thereafter 30 pounds of a fine particle size delaminated kaolin was added slowly to the naphtha solution accompanied by vigorous stirring to prevent lumping of the clay. After complete addition of the clay to give a 38 percent solids dispersion in naphtha, the mixture was stirred for an additional half hour. The dispersion was then dried to remove naphtha and isopropyl alcohol and the product therefrom was pulverized. The product did not appear, on visual examination, to be any different from the original kaolin.

To determine the effect of the treatment of the kaolin with the organo titanium derivative, 3 grams of the treated kaolin and 3 grams of the untreated kaolin were separately shaken vigorously with 15 grams of water in test tubes. The tubes were then allowed to stand until the kaolin either settled to the bottom or floated on the surface of the water. The amount of treated kaolin which settled out, as determined gravimetrically, was less than 0.1 percent showing that the treated kaolin was hydrophobic whereas all of the untreated kaolin was completely wetted by the water within two seconds of the standing period.

EXAMPLE II

Equimolar quantities of tetraisopropyl titanate and oleic acid were mixed and the mixture agitated for a short period during which a slight rise in temperature indicated that a reaction was occurring. The product was then heated to expel isopropanol formed during the reaction. A slurry of kaolin clay in naphtha was prepared and then treated with 1 percent (based on the weight of the clay) of the oleic acid-tetraisopropyl titanate reaction product. Evaporation of naphtha yielded a finely divided clay product which could not be wetted by water but which dispersed easily in naphtha and which could be used to form a 70 percent solids free flowing slurry.

The original clay was easily wetted by water and a 50 percent naphtha slurry thereof was putty-like in consistency and was not flowable.

Similar treatment of a calcined clay and of a precipitated calcium carbonate which had been wetted with about 1 percent water by weight gave results comparable to those obtained with the uncalcined clay.

EXAMPLE III

One mole of tetraisopropyl titanate and 1 mole of oleic acid were dissolved in 2,000 grams of naphtha. Twenty-five hundred grams of a substantially dry coarse particle size kaolin clay were then added slowly to the solution with constant agitation. The agitation was continued for about 2 hours after which the naphtha and the isopropanol formed during hydrolysis of the titanate were removed by evaporation. The dry product was then pulverized in a hammer mill.

The product was found to be hydrophobic but dispersed readily in naphtha and other organic solvents to produce high solids slurries. The clay starting material was hydrophilic and could not be dispersed at high solids in organic systems.

The product was sprinkled onto oil which was floating on the surface of water. It dispersed in the oil and the resulting slurry sank in the water due to the higher specific gravity of the slurry. The oil slurry could not be caused to float on the water surface again even after vigorous agitation of the mixture.

EXAMPLE IV

One thousand grams of finely divided barium sulfate wetted with about 1 weight percent of water were added to a toluene solution containing 20 grams of the product from the reaction of equimolar quantities of tetraisopropyl titanate and oleic acid. The mixture was then stirred for about 10 minutes. The toluene was then removed by evaporation and a dry powdered product was obtained which was hydrophobic and organophilic in direct contrast to the original barium sulfate.

EXAMPLE V

Seventy grams of a finely divided ferric oxide wetted with a small amount of water was suspended in 70 grams of naphtha to form a thick putty-like slurry. The slurry was then treated with 1.6 grams of the reaction product of equimolar quantities of tetraisopropyl titanate and oleic acid. The resulting mixture showed a marked reduction in viscosity and became a free flowing slurry. Removal of the naphtha yielded a powder which dispersed readily in organic solvents but which could not be wetted by water in contrast to the original iron oxide.

EXAMPLE VI

Lauric acid was melted and then mixed with an equimolar amount of tetraisopropyl titanate to yield a product which was liquid at room temperature, circa 25°–30° C. Ten grams of the liquid was added to 500 grams of naphtha and 500 grams of a calcined clay containing about 5 grams of water were added slowly with agitation. After removal of the naphtha and isopropyl alcohol formed during the process, a particulate product was obtained which was hydrophobic and organophilic in contrast to the calcined clay starting material.

EXAMPLE VII

Perfluorooctanoic acid (0.1 mole) was melted and reacted with 0.1 mole of tetraisopropyl titanate at a temperature of 55°–60 C. A vigorous reaction occurred and the mixture boiled. A slurry of 2,000 grams of a fine particle size delaminated kaolin in 2,000 grams of naphtha was then treated with about 66 grams of the reaction mixture accompanied by vigorous agitation. After removal of the naphtha and isopropanol an olephilic and hydrophobic product was obtained.

EXAMPLE VIII

One thousand grams of a water-ground substantially dry calcium carbonate was added to 1,000 grams of naphtha containing dissolved therein 25 grams of the tetraisopropyl titanate-oleic acid reaction mixture prepared as described in Example I with constant agitation. After the addition was completed, the resultant slurry was stirred for about 30 minutes, filtered and dried. The product was hydrophobic and oleophilic in contrast to the calcium carbonate starting material.

EXAMPLE IX

One mole of tetraisopropyl titanate was mixed with 2 moles of oleic acid. Fifty grams of the mixture was dissolved in 1,000 grams of toluene and 1,000 grams of an air-floated clay containing traces of water was added slowly to the solution. The toluene and isopropanol formed during the hydrolysis of the titanate were removed to produce a dry hydrophobic oleophilic material. The product was found to disperse in oil floating on water and the resulting oil slurry sank to the bottom of the container.

EXAMPLE X

A number of clays were treated with various organo titanium compounds dissolved in an organic solvent. The extent of reaction between the clays and the titanate was measured by the increase in the carbon content of the clays. The results are set forth in Table 1 which sets forth the type of clay, the starting titanate ester, the organic compound reacted with the titanate ester to produce the desired reactant, the weight percent of substituted ortho titanate based on the dry weight of the clay, and the percent of carbon in the product. Unless otherwise indicated equimolar quantities of the titanate ester and the organic compound were used to provide the titanates. Where more than one organic compound was reacted with the titanate ester, the order of reaction is indicated by number. Thus, in Run No. 13, oleic acid was first reacted with the titanate ester followed by reaction of the intermediate product with glycerol.

TABLE 1

| Run number | Clay | Titanate used | Organic compound | Organo titanate, percent | Carbon, percent |
|---|---|---|---|---|---|
| 1 | Kaolin 95%–2 micron NX-5 | None | None | None | 0.06 |
| 2 | do | Tetraisopropyl | do | 1.8 | 0.07 |
| 3 | do | None | Oleic acid | 1.8 | 0.07 |
| 4 | do | Tetraisopropyl | do | 2.5 | 1.09 |
| 5 | do | do | do | 3.5 | 1.84 |
| 6 | do | Partially polymerized tetrabutyl. | None | 3.5 | 0.18 |
| 7 | do | do | Oleic acid | 3.6 | 1.35 |
| 8 | do | Tetraisopropyl | Levulinic acid | 4.0 | 1.57 |
| 9 | do | do | Linoleic acid | 3.67 | 1.30 |
| 10 | do | do | o-Chlorobenzoic acid | 2.9 | 1.6 |
| 11 | do | do | Diphenyl silane diol | 3.5 | 0.87 |
| 12 | do | do | Castor oil (triglyceride) | 3.5 | 2.34 |
| 13 | do | do | 1. Oleic acid plus 2. Glycerol | 3.3 0.5 | 1.81 |
| 14 | do | do | 2. Oleic acid plus 1. Geraniol | 2.8 0.7 | 1.59 |
| 15 | do | do | 2. Oleic acid plus 1. Phenol | 3.1 0.4 | 1.39 |
| 16 | do | do | 2. Oleic acid plus 1. m-cresol | 3.0 0.5 | 1.45 |
| 17 | do | do | 2. Oleic acid plus 1. 2-phenoxyethanol | 1.75 1.15 | 1.07 |
| 18 | do | do | 1. Oleic acid plus 2. Diethylene glycol | 1.75 1.75 | 1.75 |

TABLE 1—Continued

| Run number | Clay | Titanate used | Organic compound | Organo titanate, percent | Carbon, percent |
|---|---|---|---|---|---|
| 19 | do | do | 1. oleic acid plus <br> 2. 2,6-dioctadecyl cresol | 2.8 <br> 0.7 | 1.72 |
| 20 | do | do | 2. oleic acid plus <br> 1. 1-(2-pyridylazo)-2-naphthol | 3.975 <br> 0.025 | 1.53 |
| 21 | do | do | 2. oleic acid plus <br> 1. Naphthol AS (General Aniline & Film Corp. dye No. C 137505) | 3.478 <br> 0.022 | 1.43 |
| 22 | Calcined clay Whitetex | None | None | None | 0.02 |
| 23 | do | Tetraisopropyl | Oleic acid | 3.5 | 0.89 |
| 24 | do | do | 2. oleic acid plus <br> 1. methyl red | 3.475 <br> 0.025 | 1.31 |
| 25 | do | do | 2. oleic acid plus <br> 1. 1-(2-pyridylazo)-2-naphthol | 3.475 <br> 0.025 | 1.28 |
| 26 | do | do | 2. oleic acid plus <br> 1. anisyl alcohol | 2.9 <br> 0.6 | 1.35 |
| 27 | Metakaolin Hi-Opaque | None | None | None | 0.06 |
| 28 | do | Tetraisopropyl | Oleic acid | 3.67 | 1.16 |
| 29 | Delaminated clay (ASA-NC) | do | do | 3.5 | 0.87 |
| 30 | A coarse clay ca. 25%, 2 micron (ASA-LO) | do | do | 3.5 | 1.36 |
| 31 | Hydrothermally rehydrated metakaolin | do | do | 5.0 | (*) |

*Not analyzed for carbon. Infrared analysis showed the presence of organic material. Product was oleophilic.

The reactions shown in Table 1 were accomplished using a variety of solvents including naphtha, trichloroethylene, toluene and hexane. The nature of the solvent did not affect the reaction.

As shown in Table I, multifunctionality can be introduced into the titanate used to treat the inorganic filler by reacting the titanate with more than one organic compound. Thus, illustrating with Run number 18, 0.5 mole of tetraisopropyl titanate was first reacted with 0.5 mole oleic acid and then with 0.5 mole of diethylene glycol. Then a total of 35 grams of the reaction product was reacted with 1,000 grams of the fine particles of a delaminated clay in a 50 percent solids slurry in naphtha. Thirty-five grams is equal to 3.5 weight percent of organo titanate or to 1.75 percent product derived from oleic acid and 1.75 percent product derived from diethylene glycol.

Referring to the Table, run numbers 1-3 show by percentage of carbon increase that all the reactants are necessary in order to obtain the products of this invention, i.e., neither the orthotitanate or the organic compound when used alone creates the desired product. Run Number 6 verifies these results. The use of aliphatic acids, silanols, phenols, alcohols and esters in preparing the substituted alkyl titanates for reaction with the clays is demonstrated by several of the runs shown in the table. The use of uncalcined clay, calcined clay, delaminated clay, metakaolin and a hydrothermally rehydrated kaolin is shown. Whenever any of these clays were known to be completely dry, from 0.1 to 2 percent of water was added to the clay prior to the reaction with the substituted organo titanate esters.

The products from runs 12, 13, 17 and 18 were dispersed in a standard aqueous coating formulation at high loadings to give satisfactory paper coatings. The products of all the runs according to our invention when reacted with clay were found to be dispersible at high percent solids in organic solvents and to be hydrophobic in nature.

EXAMPLE XI

Equimolar quantities of tetraisopropyl titanate and 3,7-dimethyl-2,6-octadien-1-ol were mixed forming a homogeneous solution which was then heated to boiling causing the two materials to coreact. Isopropanol formed during the reaction was removed by evaporation. About 20 grams of the product were then used to treat 500 grams of a fine particle size clay suspended in 500 grams of naphtha to produce a fluid slurry from which the treated clay was easily recovered by evaporation of the naphtha.

EXAMPLE XII

One thousand grams of a primary English clay was suspended in trichloroethylene and then treated with 35 grams of triisopropyl monooleyl titanate with constant agitation. After removal of the solvent and isopropanol formed during the reaction an oleophilic and hydrophobic clay was obtained. The original starting clay was easily wetted by water.

It is obvious that many variations may be made in this invention without departing from the spirit and scope thereof as described in the appended claims.

What is claimed is:

1. A composition of matter comprising an inorganic material in particulate or fibrous form the surfaces of which have been reacted with an organo titanium compound containing at least two hydrolyzable groups and which is represented by the formula $Ti(OR)_m R'4_{-m}$ wherein R is a hydrocarbon radical containing from one to 12 carbon atoms and R' is OCOR'', OR''', or OSiR'' wherein R'' is a substituted or unsubstituted hydrocarbon radical having from one to 40 carbon atoms and wherein R''' is a substituted or unsubstituted hydrocarbon radical having from six to 40 carbon atoms providing that R''' and R are not identical and wherein $m$ is equal to 2 or 3, and wherein said inorganic material prior to reaction with said organo titanium compound contains at its surface either adsorbed water, in an amount ranging from about 0.1 to about 2 percent, weight percent, based on the filler, or reactive hydroxyl groups or both reactive hydroxyl groups and said adsorbed water, whereby the hydrolyzable groups of said compound thereof are hydrolyzed by said adsorbed water or reactive hydroxyl groups, or both, to produce a polymeric organo titanium compound at the surfaces of said inorganic material.

2. A composition of matter as in claim 1 wherein the organo titanium compound is triisopropyl monooleyl titanate.

3. A composition of matter as in claim 1 wherein the organo titanium compound is diisopropyl dioleyl titanate.

4. A composition of matter as in claim 1 wherein the organo titanium compound is present in an amount ranging from 0.5 to 6 weight percent based on the dry weight of the inorganic material.

5. A composition of matter as in claim 1 wherein the inorganic material at its surface contains from about 0.1 to about 2.0 weight percent of adsorbed water.

6. A composition of matter as in claim 1 wherein the inorganic material is clay.

7. A process for providing a hydrophobic, oleophilic inorganic material which comprises reacting the inorganic material with an organo titanium compound containing at least two hydrolyzable groups and which is represented by the formula $Ti(OR)_mR'_{-m}$ wherein R is a hydrocarbon radical containing from one to 12 carbon atoms and R' is OCOR'', OR''', or OSiR'' wherein R'' is a substituted or unsubstituted hydrocarbon radical having from one to 40 carbon atoms and wherein R''' is a substituted or unsubstituted hydrocarbon radical having from six to 40 carbon atoms providing that R''' and R are not identical and wherein $m$ is equal to 2 or 3, and wherein said inorganic material prior to reaction with said organo titanium compound contains at its surface either adsorbed water, in an amount ranging from about 0.1 to about 2 percent, weight percent, based on the filler, or reactive hydroxyl groups or both reactive hydroxyl groups and said adsorbed water, whereby the hydrolyzable groups of said compound are hydrolyzed by said adsorbed water or reactive hydroxy groups, or both, to produce a polymeric organo-titanium compound at the surfaces of said inorganic material.

8. A process as in claim 7 wherein said inorganic material prior to reaction with the organo titanium compound contains at its surface from about 0.1 to about 2.0 percent by weight of water based on the dry weight of the inorganic material.

* * * * *

UNITED STATES PATENT OFFICE
CERTIFICATE OF CORRECTION

Patent No. 3,660,134　　　　　　　　Dated May 2, 1972

Inventor(s) Horton H. Morris and James P. Olivier

It is certified that error appears in the above-identified patent and that said Letters Patent are hereby corrected as shown below:

Col. 1, line 55, replace "particule" by -- particulate --;

Col. 2, line 5, replace "(OH)" by -- $(OH)_8$ --;

Col. 2, line 6, replace "$8Si_4Al_4O_{10}$" by -- $Si_4Al_4O_{10}$ --;

Col. 2, line 17, replace "$Ti(OR)_m R'^-_m$" by -- $Ti(OR)_m R'_{4-m}$ --;

Col. 3, line 7, replace "gernaiol" by -- geraniol --;

Col. 6, line 1, replace "55°-60 C" by -- 55-60°C --;

Col. 8, line 43, replace "$Ti(OR)_m R'4_{-m}$" by -- $Ti(OR)_m R'_{4-m}$ --;

Col. 8, line 57, delete "thereof";

Col. 9, line 2, replace "$Ti(OR)_m R'_{-m}$" by -- $Ti(OR)_m R'_{4-m}$ --.

Signed and sealed this 19th day of December 1972.

(SEAL)
Attest:

EDWARD M. FLETCHER, JR.　　　　　　　　ROBERT GOTTSCHALK
Attesting Officer　　　　　　　　　　　　Commissioner of Patents